United States Patent [19]
Altadonna

[11] 3,734,854
[45] May 22, 1973

[54] LIQUID PROCESSING SYSTEM
[76] Inventor: James Altadonna, 90 East 2nd St., Deer Park, N.Y. 11729
[22] Filed: Dec. 29, 1971
[21] Appl. No.: 213,442

[52] U.S. Cl..............................210/203, 210/259
[51] Int. Cl. ..................................B01d 35/02
[58] Field of Search................210/192, 205, 167, 210/406, 356, 203, 259

[56] References Cited
UNITED STATES PATENTS
3,343,677  9/1967  Okada............................210/205 X Primary Examiner—Frank A. Spear, Jr.
Attorney—Allen R. Morganstern

[57] ABSTRACT

A liquid processing system for the treatment of a liquid byproduct heretofore unfit for reuse or disposal due to the presence therein of impurities, the system providing first a filter for the removal of solid impurities, a second filter for the removal of foam as well as additional solid impurities and finally a mixing chamber for mixing the liquid byproduct, heretofore filtered, with quantities of the liquid byproduct in its pure state, in such proportions and in such amounts so as to provide upon discharge from the system, a virtually pure, reusable liquid.

5 Claims, 3 Drawing Figures

INVENTOR.
JAMES ALTADONNA
BY
Allen R. Morgenstern
ATTORNEY

Patented May 22, 1973

INVENTOR.
JAMES ALTADONNA
BY
Allen R. Morganstern
ATTORNEY

LIQUID PROCESSING SYSTEM

BACKGROUND AND OBJECTS OF THE INVENTION

The present invention is directed to providing a processing system for the treatment of a liquid byproduct such that the liquid byproduct can either be reused or disposed of without fear of polluting. Although the present invention has wide applicability with respect to any number of liquid byproducts, it has particular use with respect to the treatment of the soapy water discharged from a washing machine, dishwasher or the like. However, nothing herein should be interpreted to so restrict the scope of this invention so as to have it applicable only to such devices. On the contrary, the present invention has wide applicability and has applicability to any situation wherein a liquid byproduct contains foreign matter so as to prevent its reuse or safe discharge without polluting, and the reference herein to the discharge from a washing machine, dishwasher or the like, is merely an effort to set forth an exemplary embodiment of the invention for the purposes of illustration.

Heretofore, water discharged from a washing machine, dishwasher, or the like, was felt to be incapable of reuse and only fit for discharge into the sewage disposal system of a locality, be it actual sewers or septic tanks. In either case, pollutants were dumped directly into the envioronment without the ability to further use the discharged liquid. In the case of disposal via sewers, the addition of the pollutants contained in the discharge often led to the pollution of local bodies of water into which the sewers fed or in the alternative, required the installation of costly sewage treatment plants capable of treating said discharge to remove said pollutants. In the case of disposal via septic tanks, the pollutants in said discharge would invariably cause the clogging and backing up of said septic tanks, resulting in costly repair and maintenance.

It is therefore an object of this invetion to provide a liquid processing system that overcomes the above recited problems that heretofore have existed in the prior art.

It is another object of this invention to provide a liquid processing system that is compact in design, rugged in construction and dependable in operation.

It is another object of this invention to provide a liquid processing system that purifies the soapy water discharged from a washing machine, dishwasher, or the like such that said liquid discharge can be reused as water for watering vegetation without detriment thereto.

It is another object of this invention to provide a liquid processing system that purifies the soapy water discharge from a washing machine, dishwasher, or the like such that said liquid discharge can be disposed of via a septic tank without the fear of clogging or bakcing up said septic tank.

It is another object of this invention to provide a liquid processing system that incorporates a uniquely designed mixing chamber capable of achieving the proper mix of pure liquid to polluted liquid previously processed.

Objects and advantages of the invention are set forth in part herein and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

SUMMARY OF THE INVENTION

Briefly described, the present invention is directed to a new and improved liquid processing system for the treatment of a liquid byproduct heretofore unfit for reuse or disposal due to the presence therein of impurities.

In accordance with the invention, the liquid byproduct is first passed through a filtering unit capable of removing solid impurities from the liquid byproduct. After having passed through said solid filtering unit, the liquid byproduct is then fed to a second filtering chamber capable of removing foam from the liquid byproduct as will as solid impurities which passed unfiltered through the first filtering unit. The liquid byproduct is then fed into a mixing chamber wherein the liquid byproduct heretofore filtered, and quantities of the liquid byproduct in a pure state, are mixed in proportions and amounts so as to provide upon discharge from the mixing chamber a virtually pure, reusable liquid. By utilizing a mixing chamber having two inlets at right angles to each other whose respective streams of flow are separated by a planar member having an angular opening formed therein located near the outlet of the mixing chamber which is parallel to the inlet that directs the pure liquid into the mixing chamber, a mixing chamber is provided that is capable of regulating the proportions of filtered liquid byproducts to pure liquid that appears at the output of said mixing chamber.

It will be understood that the foregoing general description and the following detailed description as well are exemplary and explanatory of the invention but are not restrictive thereof. Thus, while the liquid processing system of this invention has particular use in the processing of soapy water discharged from a washing machine or dishwasher, the principles of the invention underlying said application, are not limited to such usage. However, as previously stated, since the invention is particularly adaptable to such usage, reference will be made hereinafter thereto in order to provide an example of a particular and useful embodiment of the invention.

The accompanying drawings, referred to herein and constituting a part hereof, illustrate a preferred embodiment of the invention, and together with the description, serve to explain the principles of the invention.

DESCRIPTION OF A PREFERRED EMBODIMENT

Figure 1:
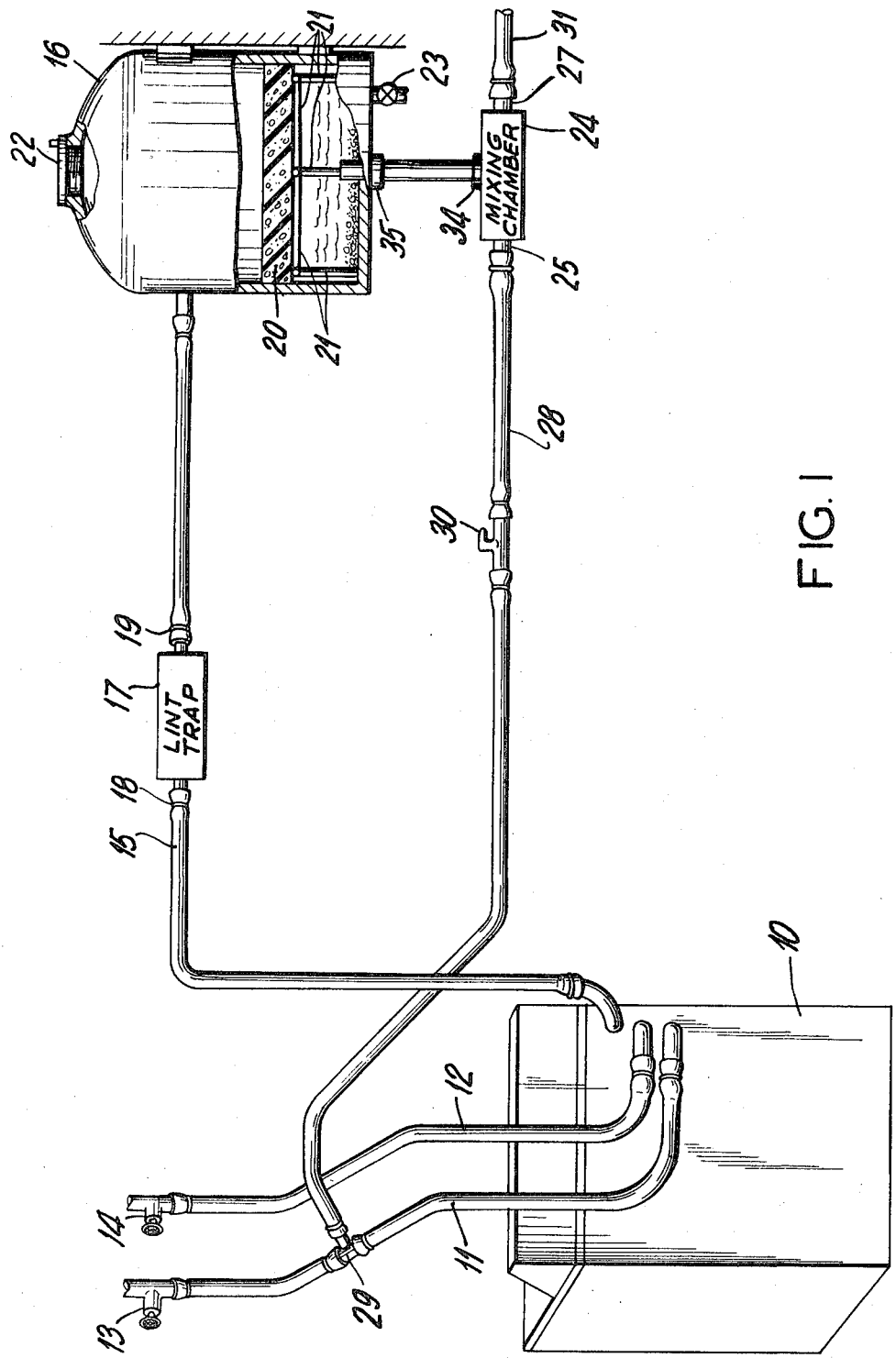
FIG. 1 is a diagrammatic illustration of the liquid processing system embodying the present invention wherein the filtering tank of the system is illustrated in partial sections and the source of the liquid to be treated is a washing machine.

In FIG. 1, there is illustrated one embodiment illustrative of the present invention. In particular, there is depicted a washing machine 10 connected via water lines 11 and 12 to external supplies of water, one such supply being unheated and the other such supply heated. Valves 13 and 14 provide a control function well known in the prior art whereby water lines 11 and 12 can be selectively coupled to or decoupled from the external supplies of water. Water Line 15 connects filter chamber 16 to washing machine 10 via filter 17, hereinafter referred to as lint trap 17.

As depicted in FIG. 1, cycled water containing soap or detergent, suds, lint and other impurities is discharged from washing machine 10 via water line 15 and first fed through lint trap 17 wherein impurities such as lint and the like are filtered from the cycled water. Lint trap 17 can be one of any number of designs well know in the prior art and is capable of being removed from the system to facilitate cleaning simply by removal of clamping members 18 and 19.

In keeping with the invention, cycled water, after it has passed through lint trap 17, is then fed via water line 15 to filtering tank 16. As depicted in FIG. 1, filter tank 16 has filtering material 20 positioned below the inlet of water line 15 to the filter tank. Filtering material 20 rests upon supporting members 21 such that the entire cross-sectional area of filter tank 16 is covered by the filtering material 20 thereby necessitating the cycled water, fed into filter tank 16 through water line 15, to pass through filtering material 20 as the water gravitates to the bottom of filter tank 16.

Filtering material 20 is capable of removing the suds contained within the cycled discharge eminating from washing machine 10. In addition, filtering material 20 is capable of removing solid pollutants contained within the cycled water. Although it is within the scope of this invention to utilize many types of filtering compositions for filtering material 20, one such composition found to be in accordance with this invention is a composition of flexible polyester urethane foam.

As depicted in FIG. 1, a threaded rotatable access hatch 22 provides a means for access to the interior of filtering chamber 16 to enable removable and replacement of filtering material 20 as well as to enable cleaning of the interior of said chamber. A draining valve 23 is additionally provided at the bottom of filtering chamber 16 to provide a means for draining filter tank 16 of any and all liquid as well as providing an outlet through which solid pollutants that have collected on the on the bottom of the tank can be removed.

In keeping with the invention, a mixing chamber 24 is provided having two inlet ports 25 and 26 and one outlet port 27. Inlet port 25 is coupled via pure water line 28 to water line 11 via "T" valve 29. Shut off valve 30 appears in pure water line 28 as depicted in FIG. 1 and provides control over the flow of pure water from an external supply into mixing chamber 24 via inlet port 25.

Figure 2:
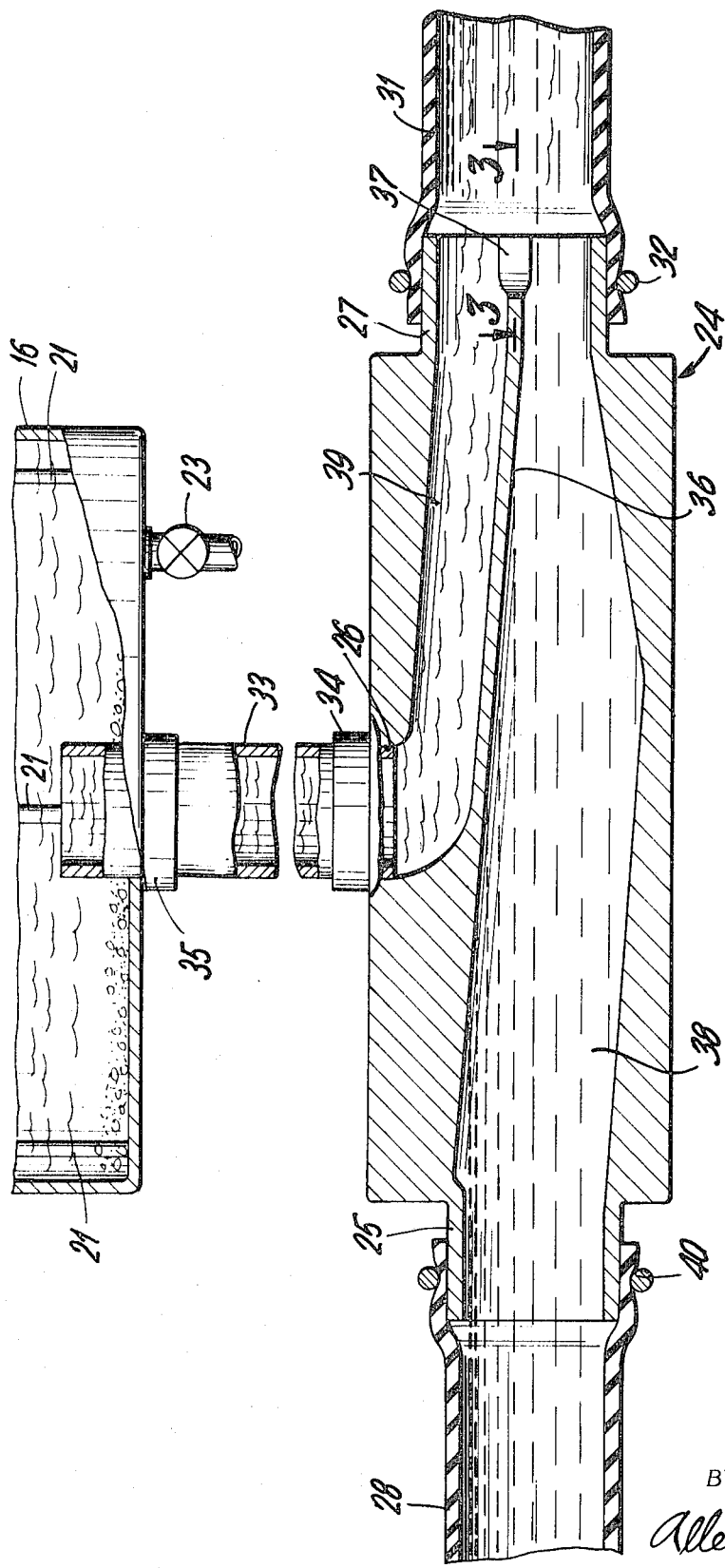
FIG. 2 is an enlarged partial cross-sectional view of the mixing chamber and its related inputs and outputs as depicted in FIG. 1.

Reference is now made to FIG. 2 wherein there is depicted an enlarged partial cross-sectional view of mixing chamber 24 and its interrelationship with filtering chamber 16, water line 28 and output line 31. As depicted in FIG. 2, mixing chamber 24 is a totally enclosed cavity having two inlet ports 25 and 26 and one outlet port 27. In keeping with the invention, pure water line 28 is coupled to inlet port 25 of mixing chamber 24 via ring clamp 40. Similarly, output line 31 is coupled to output port 27 of mixing chamber 24 via ring clamp 32. Inlet port 26 is coupled to filtering chamber 16 via coupling line 33, said coupling line 33 being fitted with leak proof fittings 34 and 35 to mixing chamber 24 and filtering chamber 16 respectively. Coupling line 33 is fitted into filtering chamber 16 such that the end of coupling line 33 extends above the bottom of filtering chamber 16 to thereby avoid having the solid pollutants that collect at the bottom of filtering chamber 16 flow via coupling line 33 into mixing chamber 24.

Mixing chamber 24, in accordance with the invention, provides two separate and distinct channels of flow for the channeling in one case of pure water from water line 28, through inlet port 25, to outlet port 27, and in the other case, cycled water from filtering chamber 16 through coupling line 33, through inlet port 26, to outlet port 27. Each channel of flow within mixing chamber 24 is separated from the other by flange member 36, which has formed in it at outlet port 27 a through opening 37.

Through opening 37 formed within flange member 36 is semicircular in shape and provides the means whereby the flow of pure water from pure water line 28 interreacts with the flow of cycled water from filtering chamber 16 to provide the desired regulated proportions of filtered cycled water to pure water such that the output discharged into output line 31 is virtually pure and thereby capable of disposal either via sewers, septic tanks or through the watering of vegetation, without fear of polluting, damaging or clogging sewage treatment equipment or killing of vegetation.

The design of mixing chamber 24 is such that it comprises two flow chambers 38 and 39, each having an inlet and an outlet. As depicted in FIG. 2, flow chamber 38 runs longitudinally along the full length of mixing chamber 24 while flow chamber 39 has its inlet at right angles to the inlet of flow chamber 38 but whose outlet is parallel to the outlet of flow chamber 38 thus defining an angular chamber. While the cross-sectional area at inlet port 25 of the inlet to flow chamber 38 is greater than the cross-sectional area at outlet port 27 of the outlet of flow chamber 38, the cross-sectional area at inlet port 26 of the inlet to flow chamber 39 is approximately identical to the cross-sectional area of the outlet to flow chamber 39 at outlet port 27. As hereinbefore mentioned, flange member 36 separates flow chamber 38 from flow chamber 39 but for the forming therein of through opening 37 which provides an interconnection between said chambers at their respective outlets.

In accordance with the invention, flow chamber 38 is formed such that its cross-sectional area at inlet port 25 is greater than its cross-sectional area at outlet port 27. Thus, the flow of any liquid entering flow chamber 38 at inlet port 25 becomes constricted at outlet port 27 causing an increase in the rate of flow of the liquid at outlet port 27 as well as causing the flow of said liquid to be directed with force out of mixing chamber 24 in a direction parallel to the flow of liquid entering flow chamber 38 at inlet port 25. Due to the increase in the rate of flow at outlet port 27 of a liquid passing through the constricted portion of flow chamber 38 and due to the fact that the outlet to flow chamber 39 is at right angles to its inlet and removed a distance therefrom, liquid flowing through flow chamber 38 does not back up into filtering chamber 16. In addition, due to the forming of through opening 37 in flange member 36 at the outlets of flow chambers 38 and 39, thereby interconnecting flow chambers 38 to 39 at said point, liquid is drawn in a regulated amount from flow chamber 39 at the location of through opening 37 by the passage of liquid through the constricted outlet of flow chamber 38. This drawing action on the part of the liquid passing through the outlet of flow chamber 38 draws filtered liquid from filtering chamber 16 in such regulated quantities so as to safely discharge the output from mixing chamber 27 as desired. By controlling the rate of flow of the liquid supplied via line 28 to flow chamber 38, by selectively varying the relative cross-sectional areas of the inlet to and the outlet from flow chamber 38, by selectively varying the size of said through opening 37 formed within flange 37 and by selectively sizing the cross-sectional areas of the outlets to flow chambers 38 and 39, almost any desired mixing ratio can be achieved in output line 31 between the pure liquid flowing through flow chamber 38 and the filtered liquid entering flow chamber 39 from filtering chamber 16.

Figure 3:
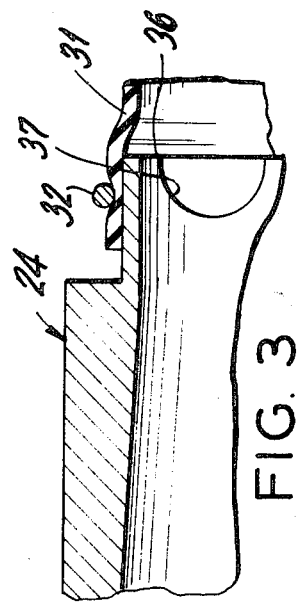
FIG. 3 is a partial cross-sectional view taken along line 3—3 of FIG. 2.

Reference is now made to FIG. 3 wherein there is illustrated an enlarged partial cross-sectional view of flange member 36 wherein there is formed through opening 37. As hereinbefore mentioned, and as depicted in the drawings, through opening 37 takes the form of a semi-circular opening. However, it should be pointed out, that nothing herein shall be so interpreted as to restrict the scope of this invention to having through opening 37 take the form of a semi-circle opening. It is well within the scope of this invention to have said through opening take almost any form or shape.

To illustrate the invention, reference is made to FIG. 1. Cycled water containing soap, suds, lint and other impurities and/or pollutants is first discharged from washing machine 10 via water line 15, through lint trap 17 wherein lint and other solid impurities are filtered from the cycled discharge, and said cycled water is then fed into filtering tank 16. At the same time, control valve 30 is opened to permit water from an external municipal source to flow from water line 11 via "T" valve 29 and water line 28 to mixing chamber 24 and through said chamber via flow chamber 38. The cycled water fed into filtering tank 16 gravitates down through filter material 20. Foam and additional impurities, heretofore missed by lint trap 17, are filtered from said cycled discharge by filter material 20.

The filtered discharge is then fed into flow chamber 39 of mixing chamber 24 while unpolluted water from an external municipal source is being fed through flow chamber 38. As a result of the constriction of flow chamber 38 at its outlet, the unpoluted water flowing therein has its rate of flow accelerated at a point where through opening 37 interconnects flow chamber 39 (with its filtered discharge that originated from washing machine 10) and flow chamber 38 (with its unpolluted water from an external municipal source). The accelerated flow of water at the outlet of flow chamber 38 draws, at a selected rate, a quantity of filtered discharge from flow chamber 39 such that the combined mixture fed into output line 31 is one that is regulateable and thus virtually pure, unpolluted and safe for disposal through municipal sewers, backyard septic tanks or via watering of vegetation.

The preceeding description and accompanying drawings relate primarily to the use of the invention as a liquid processing system for the treatment of soapy water discharged from a washing machine, dishwasher and the like. However, as previously mentioned, it is to be understood that the invention as herein described is not limited to such usage, but is equally applicable to any situation wherein a liquid becomes polluted and must be treated prior to disposal to render it suitable for disposal. Thus, the invention in its broader aspects is not limited to the specific embodiment herein shown and described but departures may be made therefrom within the scope of the accompanying claims, without departing from the principles of the invention and without sacrificing its chief advantages.

I claim:

1. A liquid processing system for treatment of a liquid byproduct discharged after utilization within a process, said system comprising:
   a. a filter having an inlet and an outlet coupled to receive, at its inlet, after cycling, said discharged liquid byproduct, said filter being capable of removing solid impurities from said discharged liquid byproduct;
   b. a filtering chamber having an inlet and an outlet formed therein such that discharged liquid byproduct entering the inlet of said filtering chamber gravitates to said outlet of said filtering chamber through filtering material capable of filtering from said discharged liquid byproduct solid as well as foamed impurities;
   c. means for coupling the inlet of said filtering chamber to the outlet of said filter to thereby enable the passage of said discharged liquid byproduct from said filter to said filtering chamber; and
   d. a mixing chamber defining a first and second flow chamber having inlet and outlet ports, said flow chambers being separated by a flange member having an opening formed therein at said outlet ports so as to interconnect said flow chambers, wherein the inlet port to said first flow chamber is coupled to a source of said liquid byproduct in its pure state, the inlet port to said second flow chamber is coupled to receive said filtered discharged liquid byproduct from said filtering chamber and the outlet ports of said first and second flow chambers are formed to open into a common outlet to thereby permit mixing of the liquids conveyed by said filtering chambers upon discharge of said liquids from said mixing chamber.

2. A liquid processing system as described in claim 1 wherein the opening formed in said flange member interconnecting said first and second flow chambers is semi-circular in shape.

3. A liquid processing system as described in claim 1 wherein the cross-sectional area of said inlet port of said first flow chamber is greater than the cross-sectional area of said outlet port of said first flow chamber.

4. A liquid processing system as described in claim 3 wherein the inlet ports of said first and second flow chambers are at right angles to each other.

5. A liquid processing system as described in claim 4 wherein the axis of the inlet port and the axis of the outlet port of said first flow chamber are parallel.

* * * * *